United States Patent [19]

Gellman et al.

[11] Patent Number: 4,743,460

[45] Date of Patent: May 10, 1988

[54] SOFT CANINE BISCUIT CONTAINING DISCRETE PARTICLES OF MEAT AND OTHER MATERIALS AND METHOD FOR MAKING SAME

[75] Inventors: Gary Gellman, Summit; George A. Erfurt, Lawrenceville; James E. Roe, Wayne, all of N.J.

[73] Assignee: Nabisco Brands, Inc., Parsippany, N.J.

[21] Appl. No.: 736,247

[22] Filed: May 21, 1985

Related U.S. Application Data

[63] Continuation of Ser. No. 549,353, Nov. 7, 1983, Pat. No. 4,534,990, which is a continuation-in-part of Ser. No. 341,970, Jan. 22, 1982, Pat. No. 4,454,164.

[51] Int. Cl.$^4$ .............................................. A23K 1/00
[52] U.S. Cl. ..................... 426/549; 426/623; 426/630; 426/646; 426/805
[58] Field of Search ............... 426/92, 94, 549, 555, 426/560, 623, 630, 512, 646, 466, 805; 119/29.5

[56] References Cited

U.S. PATENT DOCUMENTS

| | | |
|---|---|---|
| 113,063 | 3/1871 | Kirkwood . |
| 248,247 | 11/1881 | Witsil ................................ 426/641 |
| 309,502 | 12/1884 | Wylam . |
| 309,503 | 12/1884 | Wylam . |
| 982,711 | 1/1911 | Ellis ................................ 119/29.5 |
| 1,018,415 | 3/1912 | Ellis . |
| 2,138,177 | 11/1938 | Kruger et al. . |
| 2,878,127 | 3/1959 | Forkner ................................ 426/94 |
| 3,134,677 | 5/1964 | Glabe ................................ 426/94 |
| 3,656,966 | 4/1972 | Ball ................................ 426/94 |
| 3,808,340 | 4/1974 | Palmer ................................ 426/805 |
| 3,808,341 | 4/1974 | Rongey ................................ 426/305 |
| 3,883,672 | 5/1975 | Bone et al. ................................ 426/311 |
| 3,976,799 | 8/1976 | Kelly et al. . |
| 4,032,665 | 6/1977 | Miller et al. ................................ 426/104 |
| 4,039,689 | 8/1977 | Bone ................................ 426/99 |
| 4,055,681 | 10/1977 | Balaz et al. ................................ 426/656 |
| 4,145,447 | 3/1979 | Fisher et al. ................................ 426/72 |
| 4,229,485 | 10/1980 | Brown et al. ................................ 426/305 |

FOREIGN PATENT DOCUMENTS

| | | |
|---|---|---|
| 1310348 | 3/1973 | United Kingdom ................ 426/641 |
| 1465055 | 2/1977 | United Kingdom . |
| 1465267 | 2/1977 | United Kingdom . |

OTHER PUBLICATIONS

Barnhart, "The American College Dictionary", Random House Publishers, (1970), p. 146.

Lustig et al., The Southern Cook Book of Fine Old Receipes, Culinary Arts Press, Reading, Pa., (1950), pp. 30–31.

Websters, Third New International Dictionary, Merriane Co. Publishers, (1961), p. 528.

Matz, Samuel A., "Cereal Technology", (1970), pp. 105 to 107.

Chemical Engineers' Handbook, Perry, Editor, 4th Ed., (1963), pp. 8-63 and 8-64.

*Primary Examiner*—R. B. Penland
*Attorney, Agent, or Firm*—Richard Kornutik

[57] ABSTRACT

A dry soft canine biscuit having visually apparent, discrete particles, which contain (i) meat and/or meat by-product and/or (ii) farinaceous material and/or textured vegetable protein, distributed substantially uniformly throughout the biscuit is obtained by blending the non-fat solid portion of a soft biscuit dough with particles which are substantially inert with respect to the biscuit dough, mixing the dry-blended mixture with water plus optional humectant to form an intermediate stage dough, admixing the latter with the fat portion of the biscuit dough to form a final dough, forming the final dough using low shear into pieces, and baking and drying the formed pieces to obtain a microbiologically stable product which can be packaged without a barrier material. The particle inertness is made possible by using particles having: (1) a moisture content of 35 percent by weight or less and, (2) a water activity which is less than the water activity of the soft biscuit dough. There is a substantial absence of particle color bleed into the biscuit. An example of the textured vegetable protein is textured soy protein; and an example of the farinaceous material is wheat. The discrete, visually apparent dehydrated meat particles enhance the palatability and visual attractiveness of the dry biscuit.

18 Claims, No Drawings

SOFT CANINE BISCUIT CONTAINING DISCRETE PARTICLES OF MEAT AND OTHER MATERIALS AND METHOD FOR MAKING SAME

This is a continuation of application Ser. No. 549,353, filed on Nov. 7, 1983, now U.S. Pat. No. 4,534,990, which is a continuation-in-part of application Ser. No. 341,970, filed on Jan. 22, 1982, now U.S. Pat. No. 4,454,164.

BACKGROUND OF THE INVENTION

1. Field of the Invention

The invention relates to a method for incorporating animal protein into a biscuit dough to obtain a dry soft canine biscuit having animal protein particles which are visually apparent as discrete particles and which are distributed substantially uniformly throughout the biscuit. The invention also relates to a dry soft canine biscuit containing discrete animal protein particles. The invention products have enhanced palatability and enhanced eye appeal. The invention further relates to a method of preparing such particles.

2. Description of the Prior Art

Dry pet food are commonly cereal type materials having a low moisture content of less than about 15 percent by weight. As a result of their low moisture content, they resist mold growth and bacterial spoilage. Additionally, they can often be packaged and stored in containers, such as a box, without the need for hermetic sealing and without the need for a moisture barrier. Dry pet foods typically have low palatability because of their low moisture content.

The incorporation of meat products, fish products, and poultry products into a farinaceous pet food to improve palatability and to improve nutritional values of dry pet foods, intermediate moisture products and high moisture content pet foods (more than about 50 percent by weight of water) is known in the art.

U.S. Pat. No. 3,946,123 discloses an aqueous suspension or broth of meat and meat by-products consisting in part or entirely of fish and flavored cereal chunks. The meat and meat by-products that may be used include those of fowl and fish as well as that of mammals such as cattle, swine, goats and the like. Due to the high moisture content of the product, it must be packaged in cans. In U.S. Pat. No. 4,158,706 a high moisture pet food product containing farinaceous and proteinaceous components such as meats, fish and poultry is impregnated with a preservative such as succinic acid to enable packaging within a paper or polymer film. These high moisture content products have a high shipping weight for a given amount of nutritive value and do not provide a hard surface for the strengthening of gums and for the removal of plaque from teeth.

The production of dry pet foods which contain proteinaceous and farinaceous material is disclosed in U.S. Pat. Nos. 3,962,462, 4,020,187, 4,039,689, 4,055,681, 4,145,447, 4,215,149 and 4,229,485.

In U.S. Pat. No. 3,962,462 the ingredients are first dry-blended and then water and water-containing ingredients are added until a cohesive dough is formed. A stabilizing system comprising a sugar, an edible acid and an antimycotic provides stability within the pet food when the pet food is subjected to semi-moist conditions. The product is produced in wafer form for packaging with a semi-moist pet food. The proteinaceous material includes meat, such as the flesh of cattle, swine, sheep, poultry and fish, as well as various meals such as meat and bone meal, fish meal and the like.

In U.S. Pat. No. 4,020,187 tallow or lard is added to a water slurry of a ground mixture of meat and meat by-products to raise the resulting fat content of the mixture to at least 25 percent. The resulting mixture is then homogenized to liquefy and reduce the particle size and to uniformly distribute the fat content through the meat mixture. Dry farinaceous ingredients are ground and added to the homogenized meat mixture. The blended mixture is subjected to temperatures of from 225° to 325° F. at a pressure of at least about 50 p.s.i. The product is expanded, cut and dried to obtain a product having a final moisture content of from 7 to 15 percent. The product, it is disclosed, is not externally greasy and may be packaged in ordinary paper bags or in plastic wrap.

A dry, but soft, pet food is produced in U.S. Pat. No. 4,039,689 using low temperatures and pressures. The use of the low processing temperatures, less than about 130° F., leads to the soft dry nature of the pet food, it is disclosed. Meat and meat by-products as well as dried animal by-products can be used as a protein source for the pet food in U.S. Pat. No. 4,039,689. The dried animal by-products include meat meal and bone meal.

U.S. Pat. No. 4,055,681, like U.S. Pat. No. 4,039,689, produces a soft dry pet food having a meat-like texture and appearance. Meat meal is disclosed as a protein source and fresh meat and meat by-products are used to impart palatability to the pet food.

In the production of the dry pet food products accordings to the processes of the above patents, the use of wet meat products causes substantial smearing or blending of the meat into the farinaceous material. It also causes bleeding of the protein colors into the farinaceous material which reduces the visual attractiveness of the product to the consumer and which reduces the product's hardness.

A hard dry pet food is produced in U.S. Pat. No. 4,145,447. High pressures of at least about 100 p.s.i. are used to obtain a product which is hard enough to provide chew-resistance for the removal of plaque or tartar from the animal's teeth. The product is a long-lasting one which requires about 30 minutes to 2 hours for a 25 lb. dog to consume. Dry components are mixed until homogeneous and then sufficient water is added to wet the product without affecting the apparent dry, free-flowing characteristic of the product. The wetted product is then compacted at a pressure of at least 100 p.s.i., followed by heating or baking the compacted product at a temperature of at least about 200° F. The product can contain air-dried, freeze-dried or irradiated foods such as meat, fish, fish meal, cereals, fruits, vegetables and the like. Protein fibers, such as those derived from soy protein and wheat gluten, or animal fibers, such as those derived from skin, muscles, and intestines, are optionally added to support the structure of the product. The animal fibers can be prepared by cutting, chipping, grinding, shredding, shearing or beating animal skins such as cowhide or rawhide. The high pressure used in the process of U.S. Pat. No. 4,145,447 makes the process costly. Also, the structure-supporting fibers derived from animal tissue, which are optionally used in the process of U.S. Pat. No. 4,145,447, are low in palatability. Furthermore, a product having discrete, visually apparent, meat particles is not disclosed.

U.S. Pat. Nos. 4,215,149 and 4,229,485 disclose processes for improving the palatability of dry pet foods by applying a coating, which contains proteins derived from animals, to the surface of the pet food. In U.S. Pat. No. 4,215,149 the surface of the pet food is treated with fat and then with a phosphoric acid salt. Treatment of the surface of the pet food with meat flavors and animal proteins is optional. Heating of the coated pet food, it is disclosed, must be avoided.

In U.S. Pat. No. 4,229,485 a dry biscuit is coated with a continuous glazed liver coating and is then baked to less than 18 percent moisture by weight. The liver preferably constitutes at least about 50 percent by weight of the coating, exclusive of moisture. The liver coating contains farinaceous material and comminuted liver. The hard glazed coating, it is disclosed, has the visual appearance of a meat coating to enhance the product's attractiveness to pets. The dry biscuits to which the liver coating is applied are obtained by baking a combination of uncooked farinaceous material and uncooked meat or meat by-products. The use of the uncooked meat or meat by-products in the form of finely cut flakes, preferably having their largest dimension in the range of 0.015 inch to 0.250 inch, it is disclosed, is necessary for obtaining high palatability of the product. However, the use of uncooked meat or meat by-products results in the blending of the protein color into the farinaceous material. Additionally, the flakes present in the biscuit are not visually apparent because of the liver coating.

U.S. Pat. No. 4,310,558 teaches producing a dry pet food product containing fibrous food pieces having a tough, pliable texture combined with a basal matrix containing proteinaceous and farinaceous materials having a porous texture and appearance. The fibrous food pieces, which may simulate vegetables, grains and red meat pieces, comprise denatured proteinaceous material. The food pieces are blended with undenatured proteinaceous materials and farinaceous materials. The mixture is mechanically worked under conditions of elevated temperature and pressure and finally extruded to form an expanded dry pet food product having a porous texture interspersed with food pieces having a tough, pliable fibrous texture. The mechanical working and forming is basically done in a cooker extruder, which utilizes high shear and substantial pressure.

BROAD DESCRIPTION OF THE INVENTION

An object of the invention is to provide dry soft canine biscuits, which contain meat and/or meat by-product plus farinaceous material and/or textured vegetable protein, distributed substantially uniformly throughout the biscuits. Another object of the invention is to provide a method for making such dry soft canine biscuits. A further object of the invention is to provide dry soft canine biscuits and method of producing such biscuits which overcome the disadvantages of the above prior art. A still further object is to provide a process for making such particles. Other objects and advantages of the prior art are set out herein or obvious herefrom to one ordinarily skilled in the art.

The objects and advantages of the invention are achieved by the dry soft canine biscuit and the production method of the invention.

According to the invention, there is provided a dry soft canine biscuit having discrete particles, which contain meat and/or meat by-product and which can also contain farinaceous material and/or textured vegetable protein, distributed substantially uniformly throughout the biscuit. The particles are visually apparent as discrete particles, do not separate from the remaining, or farinaceous portion of the biscuit during shipping, and enhance the palatability of the biscuit by providing a flavor impact. The product is highly stable and can be packaged directly into a paper board box. The method for making the dry soft canine biscuit of the invention is economical, does not involve the use of high pressures and/or high shear to compact the biscuit dough as in U.S. Pat. Nos. 4,145,447 or 4,229,485 avoids substantial bleeding of the animal protein color into the farinaceous material, maintains particle discreteness and achieves substantially uniform distribution of the particles throughout the biscuit. Even with the inclusion of farinaceous material and/or textured vegetable protein in the particles, there is not any loss of discreteness of the particles in the final dry soft canine biscuit. Suitable food-pet food grade dyes are used in the formation of the particles in order to color dark brown the farinaceous material and/or textured vegetable protein in the particles. Such dye does not run, bleed or the like when the particles are incorporated into the final biscuit.

The invention includes a method for making a dry soft canine biscuit having enhanced palatability and enhanced eye appeal. Discrete particles, which contain meat and/or meat by-product and which can also contain farinaceous material and/or textured vegetable protein are distributed substantially uniformly throughout the dry biscuit and are visually apparent to the consumer as discrete particles. The presence of meat-containing particles substantially above or on the biscuit surface is kept to minimum to reduce the opportunity for meat particle loss from physical abuse during transit. This particle distribution is accomplished by first dry-blending the meat particles with the non-fat solids portion of a biscuit dough, admixing the dry-blended mixture with water plus optional humectant and then adding the fat portion of the biscuit dough to form a dough. The invention process forms the dough using low pressure and/or low shear, preferably as little pressure and/or shear as possible, forming means or techniques. Alternatively, the water and fat can be admixed simultaneously with the dry-blended mixture. Meat and/or meat by-product containing particle visual awareness and biscuit hardness maintenance are achieved by using particles which are inert with respect to the biscuit dough. Meat and/or meat by-product containing particle inertness is made possible through the use of particles: (a) having a moisture content of 35 percent by weight or less; and (b) having a water activity which is less than the water activity of the biscuit dough during mixing, if the biscuit dough ingredients were mixed without particles containing the meat and/or meat by-product.

The invention also includes a process for preparing the particles which contain meat and/or meat by-product plus farinaceous material and/or textured vegetable protein. The inclusion of the non-meat material in the particles provides a significant cost reduction as compared to all meat and/or meat by-product particles. Particles of meat and/or meat by-product plus farinaceous material plus textured vegetable protein which are stable, cohesive and have particle integrity as such or in a biscuit, are unexpected to the art.

The process for preparing the dry, cohesive particles which contain meat and/or meat by-product plus farinaceous material and/or textured vegetable protein, for use in dry soft canine biscuits includes admixing the meat in particulate form and/or meat by-product in particulate form with the farinaceous material in particulate form and/or the vegetable protein in particulate form. The admixture is formed by mechanically working the mass at conditions of elevated temperatures above about 212° F. and pressure for a time sufficient to convert the mass into a flowable substance and extruding the flowable substance through a restricted orifice. The extruder is particulated and the particles are dried to form dry, cohesive particles.

DETAILED DESCRIPTION OF THE INVENTION

The dry soft canine biscuit of the invention comprises discrete, visually-apparent particles, which contain meat and/or meat by-product and which can also contain farinaceous material and/or textured vegetable protein, which are uniformly distributed throughout the biscuit. The remaining, or non-meat by-product particle portion of the biscuit is substantially free of meat particles color. The biscuits are very stable microbiologically, and can be stored without refrigeration and without a packaging barrier material such as plastic film. The biscuit can be in various shapes such as square, round, triangular tubular, cylindrical, rectangular and the like. The preferred shapes are tubular, cylindrical. The tubular shape can contain a co-extruded farinaceous filler. The biscuits can be a thickness typical of canine biscuits. A preferred thickness is about ½ inch.

The particles containing meat and/or meat by-product used in the invention can be in the form of specs, flakes, chunks, chips, granules and the like. Herein, unless otherwise noted, the phrase "particles containing meat and/or meat by-product" or its equivalent wording is meant to include the partial substitution by the farinaceous material and/or textured vegetable protein for the meat and/or meat by-product in the particles. The particles should be of sufficient size as to be visually apparent to the consumer as discrete particles when in the biscuit of the invention. Prior to incorporation into the biscuit, the particles containing meat and/or meat by-product should preferably have a diameter or granulation of between about 1/32 of an inch and ½ inch. The final biscuit will also have particles approximately in this size range. Mixtures of particles within this size range or particles having a given size within this range can be used.

Particle visual awareness and biscuit hardness maintenance are achieved by using particles containing meat and/or meat by-product which are inert with respect to the biscuit. Meat and/or meat by-product containing particle "inertness" herein means (a) the particle does not smear into the biscuit dough and retains its integrity through production of the final product, (b) that the color of the particles containing meat and/or meat by-product particle does not substantially bleed into the biscuit dough (including any dye or colorant added to color dark brown the farinaceous material and/or textured vegetable protein in the prticles), and (c) that ingredients, including any farinaceous material and/or textured vegetable protein substitutes, within the particles containing meat and/or meat by-product do not adversely affect the hardness and microbiological stability of the fina biscuit product.

Meat and/or meat by-product containing particle inertness is made possible by using meat and/or meat by-product containing particles having: (1) a moisture content of about 35 percent by weight or less and, (2) a water activity which is less than the water activity of the biscuit dough during mixing of the dough, if the biscuit dough ingredients were mixed without the meat or meat by-product containing particles. The lower water activity of the meat and/or meat by-product containing particles substantially prevents the flow of water and protein color from the particles to the dough during mixture of the dough ingredients and the particles. Higher moisture contents of the softer particles into the dough, thereby losing meat and/or meat by-product containing particle integrity. Also, higher moisture contents could create hardness reduction by the formation of steam pockets which turn into air voids upon biscuit leavening. The discreteness of the particles is locked in during drying of the dough.

Fresh meat and/or meat by-products can be dehydrated by known methods to achieve a moisture content of less than about 35 percent by weight. Dehydration also reduces the water activity of the meat and/or meat by-products. Generally, fresh beef has a moisture content of about 65 percent by weight and a water activity of about 1.0. Dehydrating the fresh meat to a moisture content of about 40 percent results in a water activity of about 0.8. Dehydration to about 12 to 20 percent by weight of water results in a water activity for the meat of about 0.7 and lower. Biscuit doughs generally have a water activity of about 0.90 and above completion of mixing of the non-fat solids portion, the water and the fat portion of the dough. Preferably, meat and/or meat by-products having a moisture content of less than or equal to about 20 percent by weight are used because they remain shelf stable without refrigeration prior to incorporation into the biscuit.

Microbiological stability of the meat and/or meat by-product containing particle ingredient is preferably achieved through a low water activity of 0.70 or less. This low water activity is preferably achieved by dehydration. However, the water activity can also be lowered by other processes known in the art. For example, to reduce the water activity, food additives conventionally used for this purpose such as glycerin, propylene glycol, salt, corn syrup, sugar and the like can be included in the meat and/or meat by-product containing particles in conventional amounts.

Commercially available meats and/or meat by-products having the above low water activity can be used for the meat and/or meat by-product particle ingredient of the invention. Microbiological stability of the meat and/or meat by-products can also be achieved even at water activities above 0.70 by the use of antimycotics together with either bacteriostats or sterilizing gases conventionally used in the art for this purpose. Exemplary of the antimycotics which can be used are potassium sorbate, sorbic acid, sodium benzoate and the like. Suitable commercially available meat products and/or meat by-products which can be used are those which are stored without refrigeration and are packaged in a film of no more than 5 g per m² per 24 hours water vapor transfer rate.

The substantial absence of color based by the particles containing only meat and/or meat by-product into the biscuit is principally due to the use of meat products wherein the color is formed as part of the protein matrix. In these meat products the protein is present in its least soluble form, namely denatured and coagulated, and therefore the color is also insoluble. Accordingly, bleeding of the meat protein color into the remaining portion of the biscuit cannot take place. The subject of lack of color bleed when farinaceous material and/or textured vegetable protein is used in place of some of the meat and/or meat by-product is treated below.

Visual awareness of the meat particles is also effected by using meat products having a dark brown denatured meat protein color. Products having a denatured meat protein color as measured by an Agtron reflectance value of 10 or less contrasts excellantly with typical biscuit doughs to effect visual awareness.

The term "meat" is understood to apply not only to the flesh of cattly, swine, sheep, goats, horses and whales, but also to other sources of animal protein, such as poultry and fish. The term "meat by-product" refers to those non-rendered parts of the carcasses of slaughtered animals, including but not restricted to mammals, poultry and fish, and includes constituents such as liver, kidney, heart, spleen, tongue, trimmings, lungs and skins, embraced by the term "meat by-products" in the *Official Publication*, "Official and Tentative Definitions of Feed Ingredients," published by the Association of American Feed Control Officials, Inc., p. 94 (1979). The flesh of some animals, such as fish and poultry may be too light in color to provide sufficient contrast with the biscuit dough so as to enhance visual awareness of the meat particles. In this case, known food colorings can be added to the meat to enhance visual awareness. The meat particles and the meat by-product particles can be used alone or in combination. Each particle may contain both meat and meat by-products from one or more animals.

The preferred particles containing only meat and/or meat by-product particles are particles of dehydrated cured meat and meat by-product, most preferably from beef. Spiced, dehydrated cured meat and meat by-product particles are highly palatabilite, have an appetizing odor and are particularly preferred for use in the canine biscuits of the invention. The preparation of dehydrated cured meat and meat by-product, spiced or unspiced, is well-known in the art and does not form a part of the invention. Suitable dehydrated cured meat and meat by-product is commercially available and is commonly referred to as jerky, jerked beef or jerked meat.

Commercially available, dehydrated cured meat products which contain more than 35 percent moisture can be dried in a conventional manner to within the above moisture content range.

Known biscuit dough formulations for the preparation of dry soft canine biscuits can be used in the production of the biscuits of the invention. As indicated above, these doughs generally have a water activity of about 0.90 and above upon completion of mixing of the dough ingredients. A suitable dough contains at least one farinaceous material, the predominant one being glutenous, salt, animal fat, flavorings, added vitamins and minerals and an antioxidant, such as those disclosed in U.S. Pat. No. 4,229,485 at column 5, lines 7 to 25 and 37 to 57, a humectant such as sugar, propylene glycol, glycerin, sorbitol and corn syrup, and chemical leavening. The compositions of the invention also preferably contain at least one animal-derived proteinaceous meal such as meat meal, bone meal and fish meal. A preferred biscuit dough for producing the biscuits of the present invention contains about 40 to about 50 percent by weight of wheat flour, about 10 to about 15 percent by weight of sugar (e.g., sucrose), about 5 to 15 percent by weight of humectant, about 3 to about 10 percent by weight of meat meal, about 1 to about 5 percent by weight of chemical leavening, about 1 to about 10 percent by weight of animal fat preserved with BHA, about 15 to about 25 percent by weight of water, and about 2 to about 5 percent by weight of natural flavors, and vitamin and mineral preblend. More generally, useful biscuit doughs can contain about 15 to about 35 percent by weight of water, about 0.5 to about 10 percent by weight of fat and about 5 to about 20 percent by weight of sugar. Use of the humectant is optional, but is preferred to enhance the softness of the product and to effect less breaking force. Suitable humectants are known in the art and include glycerin, sorbitor, proplyene glycol, corn syrup and sugar. Chemical leavening, known in the art can be used. Exemplary thereof is calcium acid phosphate with sodium bicarbonate, and/or ammonium bicarbonate.

The relative amount of the meat and/or meat by-product containing particles and the biscuit dough should be such so as to result in a dried biscuit product wherein the weight percent of the particles is about 3 to about 25 percent by weight, preferably about 5 to about 20 percent by weight, of the final dried biscuit product. Compliance to NRC nutritional requirements is enhanced by even these low levels of the 20 percent minimum protein meat and/or meat by-product particle. Lower or higher levels of the meat particles can be used provided biscuit integrity is maintained, the meat particles do not extend above the surface of the biscuit so as to separate from the biscuit during shipment, the final product remains visually attractive to the consumer, and the product is economical to produce.

In producing the soft, dry canine biscuit of the invention the meat and/or meat by-product containing particles are dry-blended with the solid non-fat portion of the biscuit dough. By incorporating the meat particles into the solid non-fat portion of the biscuit dough, the meat particles are distributed substantially uniformly throughout the final biscuit product. The portion of the particles at the surface of the biscuit are visually apparent as discrete particles. Particles substantially below surface however are also of sufficient size and integrity to be visually apparent as discrete particles upon breaking the biscuit in two, for example.

All mixing can be at 20 to 100 rpm. The dry-blending step is typically at room temperature for a period of time of about 3 minutes to about 10 minutes so as to obtain a uniform mixture of the meat and/or meat by-product containing particles and non-fat portion of the biscuit dough. The dry-blended mixture is then mixed with the hot water plus optional humectant to form a first stage dough. This methodology minimizes the occurence of meat and/or meat by-product containing particles substantially above and on the final biscuit surface. As a result, the opportunity for meat and/or meat by-product particles loss from physical abuse during transit is reduced. The water which is admixed with the dry-blended mixture is typically at a temperature of about 65° F. to about 150° F. The hot water and the optional humectant is added, with mixing, over a period of time of about 3 minutes to about 10 minutes to form the first stage dough. Then, the fat portion of the biscuit dough is admixed with the first stage dough to form the final stage dough. The fat portion is added at a temperature at which it is at least fluid, typically at about 100° F. to about 150° F. The fat portion is mixed for a period of time which is sufficient to form a dough whose homogeneity is visually apparent. A typical final mixing time is about 3 minutes to about 8 minutes.

Formation of the dough is achieved at about atmospheric pressure with mixing of the components being conveniently achieved in an upright sigma blade mixer or other bakery-type mixers. The various ingredients can be added over a period of time or in a one-shot manner according to the above order of addition. However, melted fat and water plus optional humectant may be added simulaneously and mixed 6 to 12 minutes.

The dough is then formed into pieces by horizontal or vertical extrusion followed by cutting. The cutting is preferably substantially perpendicular to the direction of flow of the extruded dough. Thus, when horizontal extrusion is utilized, the extruded dough is preferably cut substantially perpendicular to the top surface of the obeoven band. When vertical extrusion is used, the extruded dough is cut preferably substantially parallel to the top surface of the oven band. Suitable die and cutter shapes are those which result in a round, square, rectangular, triangular, tubular, or cylindrically shaped biscuit product and the like. The forming is accomplished at conventional temperatures of ambient to 110° F. and pressures of less than 75 p.s.i. (gauge), used with a horizontal or vertical extruder. An essential or critical feature of the invention is that the forming of the dough pieces is done using low shear and/or low pressure forming or techniques. High shear or high pressure forming will decimate or smear the meat and/or meat by-product containing particles or will cause bleeding or running of any dye used in the particles. The forming pressure is less than 75 p.s.i.g.

The formed pieces are then baked, followed by drying, to achieve a shelf stable product without the need for moisture barrier protection. Baking and drying temperatures and times are those conventionally used in the production of a soft, dry canine biscuit. The pieces are dried to obtain a biscuit having a water activity of 0.70 or less. Typical baking temperatures and times are about 300° F. to about an average of 475° F. for about 20 minutes to about 6 minutes. Drying conditions are typically about 200° F. to about 325° F. for about 25 minutes to about 12 minutes in a forced air dryer. On a weight basis, the moisture content of the final biscuit product is less than or equal to about 15 percent by weight and preferably about 10 to about 12 percent by weight of the final biscuit at 0.70 water activity.

The hardness of the final soft biscuit of the invention as measured in a cracking test on a Dillon dynamometer should be about 5 to about 15 lbs. for a ½ inch thick sample using a pinpoint tester having a 3/32 inch diameter tip. The tip has a concave bottom with a maximum depth of 1/16 inch. In this test, the hardness reading in pounds is linearly proportional to the sample thickness. Thus, a ¼ inch thick sample should have a hardness of about 3 to 8 lbs. A hard biscuit, as opposed to the soft biscuit of the invention, would have a Dillon dynamometer hardness value of about 30 to about 50 lbs for a ½ inch thick sample.

The invention also broadly involves a process for preparing dry, cohesive particles, which contain meat and/or meat by-product plus farinaceous material and/or textured vegetable protein, for inclusion in the canine biscuit. The meat in particulate form and/or meat by-product in particulate form is admixed with the farinaceous material in particulate form and/or the textured vegetable protein. The admixture is formed by mechanically working the mass at conditions of elevated temperature above about 212° F. and pressure for a time sufficient to convert the mass into a flowable substance and extruding the flowable substance through a restricted orifice. The extruder is particulated into particles and the particles are dried to form said dry, cohesive particles.

The particles can have up to 99 percent by weight, preferably from 10 to 80 percent by weight, and most preferably 33 to 68 percent by weight, of the meat and/or meat by-product replaced by the farinaceous material and/or textured vegetable protein. In some instances all of the meat and/or meat by-product can be replaced by the farinaceous material and/or textured vegetable protein. The inclusion of the non-meat material is the particles provides a significant cost reduction as compared to all meat and/or meat by-product particles. Particles of meat and/or meat by-product plus farinaceous material plus textured vegetable protein which are stable, cohesive and have particle integrity as such or in a biscuit, are unexpected to the art.

Except as set out herein, the information herein containing the particles containing only meat and/or meat by-products and the soft dough and biscuits containing such particles applies to the particles containing meat and/or meat by-product plus farinaceous material and/or textured vegetable protein, and the soft dough and biscuits containing such particles.

As used herein, the phrase "farinaceous material" means those grain foodstuffs containing a preponderance of starch or starch-like material. Examples of useful farinaceous grain materials are wheat, corn, oats, rye, barley, milo, rice, other cereal grains and starch from such cereal grains. The useful forms are in particles form, such as the farinaceous meals or flours obtained upon grinding cereal grains such as corn, oats, wheat, milo, barley, rice and the various milling by-products of the cereal grains, such as wheat feed flour, wheat middlings, what mixed feed, wheat shorts, wheat red dog, oat groats, hominy feed, and any other such material. Also included are protein concentrates of farinaceous ingredients such as wheat and corn gluten. Preferably the farinaceous material is wheat and preferably the farinaceous material is uded in flour form.

Any texturizable vegetable protein can be used. Examples of useful vegetable proteins which can be textured are soybeans, soy protein isolates, soy protein concentrates, cottonseed protein isolates, peanuts, peanut protein isolates, sunflower seed, lentils, sesame, rapeseed, safflower seed, peanut protein concentrates, and other vegetable oil seeds and beans. The vegetable proteins are used in particulate form such as meal and flour. Preferably the vegetable protein is soy (preferably in flour form). The vegetable protein is texturized during treatment (forming) of the particle composition in the cooker extruder.

If desired, textured vegetable protein can be used in place of the untextured vegetable protein. Particle forming in such instances can be done using pellet mills and the like.

The farinaceous material and the textured vegetable protein can be used separately or in combination.

A food-pet food grade dye or colorant is preferably used to dye the farinaceous material and/or textured (or texturizable) vegetable protein. Preferably an artificial or synthetic food grade dye is used in combination with drug and cosmetic dyes approved for use in pet foods. Examples of useful pet food dyes are brown and black iron oxide. The main criterion of a useful food-pet food grade dye within the scope of the invention is that the food-pet food grade dye has not run or bleed (at least to any degree visible by the human eye) in final soft biscuit. A food-pet food grade dye should be used which has a very high degree of fastness for the farinaceous material and/or textured vegetable protein. The water-soluble food-pet food grade dyes can be used as such or can be used emulsified in oil or fat to color the farinaceous material and/or textured vegetable protein.

When preparing a particle containing meat and farinaceous material, preferably the particle composition contains 27 to 32 percent by weight (most preferably about 29 percent by weight) of meat, 45 to 60 percent by weight (most preferably about 51 percent by weight) of farinaceous material, 10 to 20 percent by weight (most preferably about 14 percent by weight) of proteinaceous-flavoring premix, 2 to 8 percent by weight (most preferably about 5.5 percent by weight) of seasoning and 0.1 to 2 percent by weight (most preferably about 0.5 percent by weight) of colorant. The proteinaceous-flavoring premix preferably containing 40 to 65 percent by weight (most preferably about 54 percent by weight) of protein, usually soy, and 35 to 60 percent by weight (most preferably about 46 percent by weight) of flavorant(s). The particle composition can optionally contain up to about 10 percent by weight, generally 5 to 10 percent by weight, of fat.

When preparing a particle containing meat and vegetable protein preferably the particle composition contains 27 to 32 percent by weight (most preferably about 29 percent by weight) of meat, 60 to 70 percent by weight (most preferably about 65 percent by weight) of vegetable protein, 2 to 8 percent by weight (most preferably about 5.5 percent by weight) of seasoning and 0.1 to 2 percent by weight (most preferably about 0.5 percent by weight) of colorant. The particle composition can optionally contain up to about 10 percent by weight, of fat.

Preferably the particulated meat is prepared by particulating frozen meat, and preferably the particulating is achieved by chopping and the grinding the frozen meat.

In one embodiment all of the ingredients are thoroughly admixed for example in a blender. Preferably the ingredients are preconditioned during mixing in a blender which has a jacketed heater or a steam injector. The mixture is fed into a hopper of a cooker extruder.

In another embodiment the meat, about half of the seasoning and the optional fat are thoroughly admixed for example in a blender. Preferably such first mixture is preconditioned during mixing in a blender which has a jacketed heater or a steam injector. The other half of the seasoning and the remainder of the ingredients are mixed to form a second mixture. The first and second mixtures are separately and simultaneously fed into a hopper of a cooker extruder. The two mixtures are mixed by the action of the extruder. Instead of using the second mixture as such, the ingredients of the second mixture can be separately fed into the hopper.

The blended mixture is then extrusion cooked at conditions of elevated temperature and pressure at about 212° F. to about 400° F. and about 15 psig to about 300 psig respectively. The process of this invention may be practiced in a conventional cooker extruder device. The rotating screw of the extruder device creates a high pressure on the material mixed in the extruder. It is believed that the particular material changes form until it finally flows in a generally fluent manner, even squeezing around the outer periphery of the screw in a recirculating fashion column to cause a severe mechanical working of the substance. The pressures in the extruder are elevated to about 100 psig and typically will fall within the range of 100 to 200 psig. All of the pressure and the high temperatures result from the friction between flowing products and components of the extruder. During the extrusion operation, cooling water is passed through the rear and forward jacket for temperature control. The mixture is converted to a flowable substance which emerges from the nozzle of the extruder.

The unexpanded extrudate has a bulk density of about 30 lbs. per cubic foot. (A fully expanded extrudate would have a bulk density of about 5 lbs. per cubic foot.) When the particle composition contains vegetable protein as replacement for part or all of the meat and/or meat by-product, preferably the extrudate is partially expanded, having a bulk density of about 15 to about 20 lbs. per cubic foot. Partial expansion is achieved by conventional extruding techniques.

The extruder material is cut into pieces or particles of having a diameter or granulation of between about ⅛ inch and about ½ inch, preferably 3/16 inch. The final biscuit will have particles approximately in this size range too. Mixtures of particles within the size range or particles having a given size within this range can be used. The extruded material can be particulated by any suitable means, but preferably staggered cutting blades are used which are located very close to the extruder die.

The extruded particles can be dried or can be dehydrated by known methods to achieve a moisture content of less than about 35 percent by weight. Dehydration also reduces the water activity of the meat and/or meat by-products. Preferably the particles are dehydrated to about 12 to 20 percent by weight water which results in a water activity for the meat of about 0.7 and lower.

The dried particle can be weighed and bagged for storage until usage. The dried particles are shelf stable without refrigeration prior to incorporation into the soft biscuit. The dehydrated particles, spiced or unspiced are highly palatable, have an appetizing odor and are particularly preferred for use in the soft canine biscuits of the invention. The dried particles do not smear into the soft biscuit dough and retains its integrity through production of the final soft product. The particle color does not substantially bleed into the soft biscuit dough.

The invention is further illustrated in the following examples wherein all percentages, parts, ratios and proportions are by weight and all temperatures are in degrees Farenheight unless otherwise indicated.

EXAMPLE 1

In this example, spiced dehydrated cured beef granules having a moisture content of about 15 percent by weight, a granulation between 1/32 of an inch and ½ inch, and having a dark brown denatured meat protein color of Agtron reflectance value of 10 or less were used. The spiced hydrated cured meat granules were obtained by granulating dehydrated cured meat having the composition:

| Dehydrated Cured Meat | Pounds |
|---|---|
| Meat By-Products | 650 |
| Meat | 268 |
| Natural Flavors | 1 |
| Spices | 29 |
| Cure (Sodium Nitrite) | 1 |
| Potassium Sorbate | 0.5 |

| Dehydrated Cured Meat | Pounds |
|---|---|
| | 949.5 |

Then, 150 pounds of the spiced dehydrated cured meat granules were combined with the non-fat solids portion of a soft biscuit dough, the fat portion of the soft biscuit dough and water plus humectant to form a dough in accordance with the process of the invention. The ingredients, amounts, and the process for making the biscuits were:

| Biscuit and Meat Chips | Pounds |
|---|---|
| Wheat Flour (soft flour of about 9% by weight protein) | 400 |
| Sugar | 117 |
| Glycerin (humectant) | 100 |
| Dehydrated Cured Meat | 150 |
| Skim Milk Powder | 16 |
| Meat Meal | 36 |
| Chemical Leavening | 17 |
| Salt | 4 |
| Animal Fat Preserved with BHA | 75 |
| Natural Flavors | 33 |
| Vitamin and Mineral Preblend | 18 |
| Color | 1 |
| Water | 200 |
| | 1167 pounds |

The dehyrated cured meat was dry-blended with the solid non-fat portion of the biscuit dough in an upright sigma blade mixer at 20 rpm for 10 minutes. Then the 200 pounds of water, at a temperature of 150° F. plus the 100 lbs of glycerin at ambient temperature were added together with 140° F. fat to the preblend and mixed for 6 minutes to form the dough. The dough was then machined on a horizontal extruder through dies measuring ⅜ inch in diameter followed by vertical cutting into 1¼ inch length cylinders. The formed pieces were then baked in a band oven for 8 minutes followed by drying at 250° F. for 20 minutes in a band dryer to achieve dry, soft, shelf stable, canine biscuits having a Dillon dynamometer hardness reading of about 4 to 11 for the ¼ inch thick sample. The baking temperatures in the band over were:

| Band Oven Baking Temperatures | Zone |
|---|---|
| 530° F. | 1 |
| 530 | 2 |
| 550 | 3 |
| 300 | 4 |
| 300 | 5 |
| 300 | 6 |
| Off | 7 |
| Off | 8 |
| Off | 9 |

This product was dump-packed into a carton without the need for moisture barrier protection.

The hardness tests on the product were performed using a Dillon hynamometer as described above.

EXAMPLE 2

In this example, spiced dehydrated meat granules containing farinaceous material was prepared. The formulation has the following composition;

| Ingredients | Percent |
|---|---|
| Meat | 29 |
| Farinaceous material | 51 |
| Proteinaceous/flavoring premix | 14 |
| Seasoning | 5.5 |
| Coloring | 0.5 |
| | 100 percent. |

The proteinaceous/flavoring premix contained 54 percent protein (soy) and 46 percent flavoring. The composition further contained 7 percent of fat.

The meat was prepared from frozen meat (beef) which was chopped and ground. The farinaceous material was in flour form; the proteinaceous/flavoring agent was also in particle form. The color was synthetic brown food grade and brown pet food grade iron oxide dyes that had good fastness for the non-meat ingredients. All of the ingredients were thoroughly mixed (blended together) using a blender. Steam was injected into the mixture as it was blended to precondition it. The mixture was fed into the hopper of a cooker extruder.

The cooker extruder was a conventional cooker extruder having steam and water jackets. Cooling water at room temperature was passed through the cooling jackets. The screw in the extruder was rotated at 165 rpm. The extruder cooked and formed the material which was continuously passed through it. The protein in the material texturized by the heat, pressure, shear, etc. The material was continuously passed through the extruder die and was the extrudate cut into 3/16 inch pieces using staggered cutting blades. The extrudate was not expanded and had a bulk density of about 30 lbs. per cubic foot. 95 percent of the particles passed through a −4 U.S. mesh screen and stayed on a +14 U.S. mesh screen. The other 5 percent was fines. The collected particles were dried to a moisture content of 14 percent by weight. The dried particles were cohesive, appetizing in appearance and color and stable when handled. The dried particles were weighed and bagged.

Some of the dried particles were then put into a soft dough like the one in Example 1 using the procedure of Example 1. The soft dough and particles were then formed as in Example 1 into various shapes, and baked and dried as in Example 1 to form a dry, soft, shelf stable, (¼-inch thick) canine biscuits. The particles in the dried final biscuit visably discrete, had not smeared and did not show any color bleed.

EXAMPLE 3

In this example, spiced dehydrated cured meat granules containing textured soy protein was prepared. The formulation had the following composition:

| Ingredients | Percent |
|---|---|
| Meat | 29 |
| Vegetable protein (soy) | 65 |
| Seasoning | 5.5 |
| Color | 0.5 |
| | 100 percent |

The composition further contained 7 percent fat.

The meat was prepared from frozen meat (beef) which was chopped and ground. The farinaceous material was in flour form; the proteinaceous/flavoring agent was also in fine particle form. The color was a synthetic brown food and pet food grade dyes that had good fastness for the non-meat ingredients.

The meat, half of the seasoning and optional fat were thoroughly mixed in a blender having a hot water jacket, to form a first mixture. The other half of the seasoning and the rest of the ingredients were mixed, to form a second mixture. The first and second mixtures were separately and simultaneously fed into the hopper of a cooker extruder.

The cooker extruder was a conventional cooker extruder having steam and water jackets cooling water at room temperature was passed through the cooling jackets. The screw in the extruder was rotated at about 450 rpm. The extruder cooked and formed the material, which was continuously passed through it. The vegetable protein in the mixture was texturized by the heat, pressure, shear, etc. The material was continuously passed through the extruder die and was the extrudate cut into 3/16 inch pieces using staggered cutting blades. The extrudate was partially expanded (using a proper size die to achieve such upon exit to atmospheric pressure) and had a bulk density of about 20 lbs. per cubic foot. The collected particles were dried to a moisture content of 14 percent by weight. The dried particle were cohesive, appetizing in appearance and color and stable when handled. The dried particles were weighed and bagged.

Some of the dried particles were then put into a soft dough like the one in Example 1 using the procedure of Example 1. The soft dough and particles where then formed as in Example 1 into various shapes, and baked and dried as in Example 1 to form dry, soft, shelf stable, ½-inch thick, canine biscuits. The particles in the dried final biscuit were visably discrete, had not smeared and did not show any color bleed.

What is claimed is:

1. Dry soft canine biscuit consisting essentially of discrete, visually apparent dehydrated particles, which contain (i) meat and/or meat by-product and (ii) farinaceous material and/or textured vegetable protein distributed substantially uniformly throughout said biscuit, the remaining portion of said biscuit being substantially free of meat particle color and containing a major portion of at least one farinaceous material, said biscuit having a water activity of 0.70 or less, and a water content of 15 weight percent or less, based upon the total weight of said dry soft canine biscuit, said particles being present in an amount of about 3 to about 25 weight percent, based on the total weight of said dry soft canine biscuit, said particles having a water activity which is equal to or less than the remaining portion of said biscuit, and said particles being non-expanded or partially expanded, of sufficient size to be discrete and visually apparent, substantially of a size which passes through a U.S. No. 4 Mesh screen and stays on a U.S. No. 14 Mesh screen, and having a water content of 12 to 20 weight percent, based on the total weight of said dehydrated particles whereby said biscuit having been made from a soft dough containing humectant.

2. A dry soft canine biscuit as claimed in claim 1 wherein said particles are non-expanded.

3. The dry soft canine biscuit as claimed in claim 2 wherein said remaining portion of said biscuit is non-expanded.

4. The dry soft canine biscuit as claimed in claim 1 wherein said particles are partially-expanded and have a bulk density of up to about 20 pounds per square foot.

5. The soft dry canine biscuit as claimed in claim 1 wherein the farinaceous material is a glutenous farinaceous material and wherein said remaining portion of said biscuit contains at least one animal-derived proteinaceous meal.

6. Dry soft canine biscuit consisting essentially of discrete, visually apparent dehydrated particles, which contain (i) meat and/or meat by-product and (ii) farinaceous material and/or textured vegetable protein distributed substantially uniformly throughout said soft dry canine biscuit, the remaining portion of said dry soft canine biscuit being substantially free of meat particle color and containing a major portion of at least one farinaceous material, said dry soft canine biscuit having a water activity of 0.70 or less, and as water content of 15 weight percent or less, based upon the total weight of said dry soft canine biscuit, said particles being present in an amount of about 3 to about 25 weight percent, based on the total weight of said dry soft canine biscuit, said particles having a water activity which is equal to or less than the remaining portion of said biscuit, said soft dry canine biscuit being shelf stable, said soft dry canine biscuit having said particles present as discrete visually-apparent particles distributed substantially uniformly throughout, some of said discrete visually-apparent particles being visible on the surface of said dry soft canine bisuit, and said particles being non-expanded or partially expanded, and of sufficient size to be discrete and visually apparent, substantially of a size which passes through a U.S. No. 4 Mesh screen and stays on a U.S. No. 14 Mesh screen, and having a water content of 12 to 20 weight percent, based on the total weight of said dehydrated particles.

7. The dry soft canine biscuit as claimed in claim 6 wherein said particles are non-expanded.

8. The dry soft canine biscuit as claimed in claim 7 wherein said remaining portion of said biscuit is non-expanded.

9. The dry soft canine biscuit as claimed in claim 6 wherein said particles are partially-expanded and have a bulk density of up to about 20 pounds per square foot.

10. The soft dry canine biscuit as claimed in claim 6 wherein said particles are cohesive and have particle integrity.

11. The soft dry canine biscuit as claimed in claim 6 wherein said particles contain up to 99 weight percent of said farinaceous material and/or textured vegetable material.

12. The soft dry canine biscuit as claimed in claim 6 wherein said textured vegetable material is textured soy protein.

13. The soft dry canine biscuit as claimed in claim 6 wherein said farinaceous material is wheat.

14. The soft dry canine biscuit as claimed in claim 6 wherein said dry soft canine biscuit has a hardness equivalent to a reading of 5 to 15 lbs. for a biscuit having a thickness of about ½ inch measured on a Dillon dynamometer having a pinpoint tester with a 3/32 inch diameter tip having a concave bottom.

15. The soft dry canine biscuit as claimed in claim 6 wherein said particles have a dark brown denatured meat protein color of Agtron refelectance value of 10 or less.

16. The soft dry canine biscuit as claimed in claim 6 wherein said dry soft canine biscuit is tubular shaped and a farinaceous filler is contained within said tubular shaped biscuit.

17. The soft dry canine biscuit as claimed in claim 6 wherein said particles contain a food coloring and wherein the remaining portions of said biscuit are substantially free of said food coloring.

18. The soft dry canine biscuit as claimed in claim 6 wherein the farinaceous material is a glutenous farinaceous material and wherein said remaining portion of said biscuit contains at least one animal-derived proteinaceous meal.

* * * * *